Figure 1:
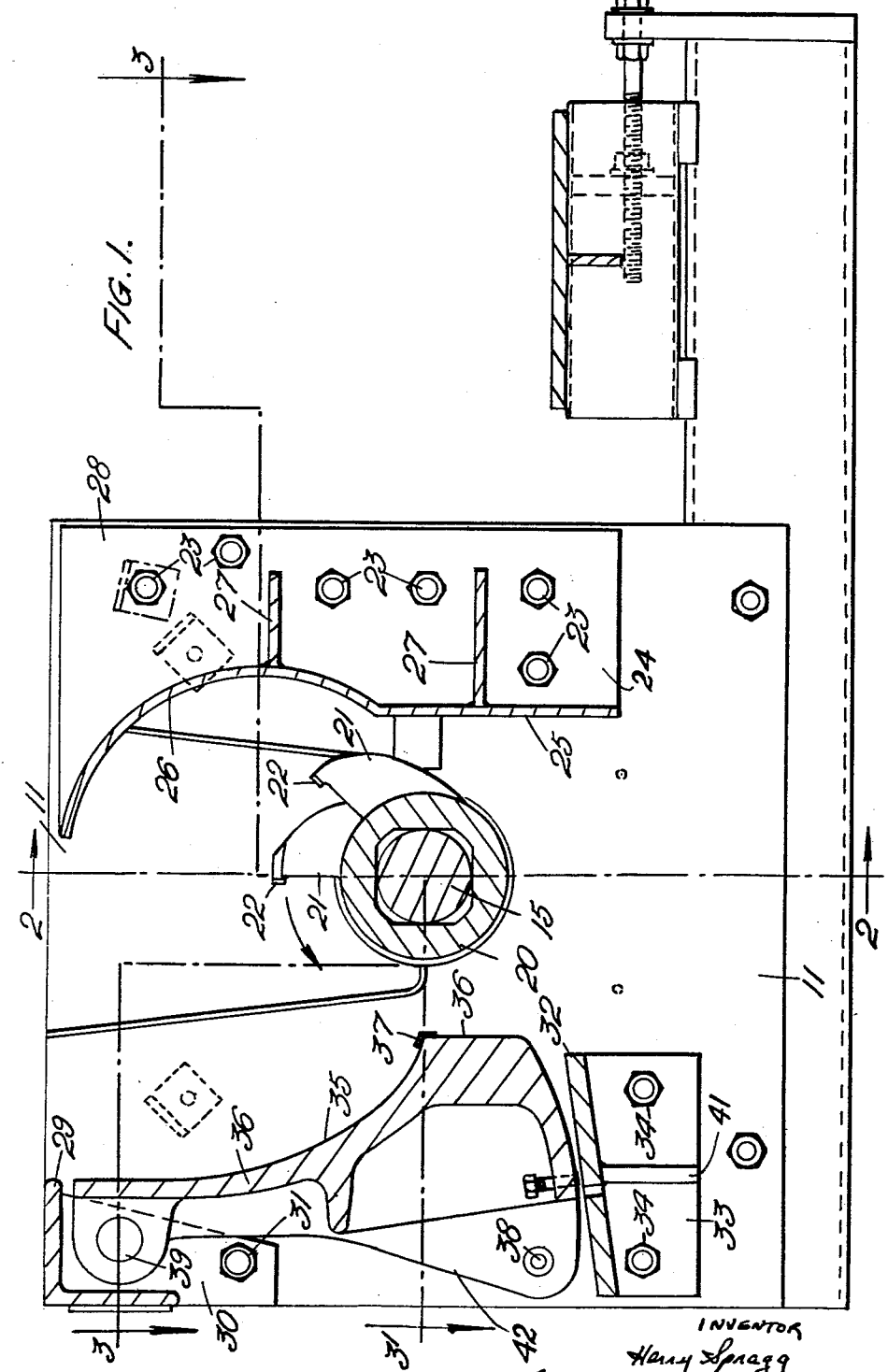

Aug. 4, 1964    H. SPRAGG    3,143,304
CRUSHING APPARATUS
Filed Aug. 15, 1960    3 Sheets-Sheet 1

INVENTOR
Henry Spragg
By Watson, Cole, Grindle & Watson

Aug. 4, 1964  H. SPRAGG  3,143,304
CRUSHING APPARATUS
Filed Aug. 15, 1960  3 Sheets-Sheet 2

INVENTOR
Harry Spragg
By Watson, Cole, Grindle & Watson
ATTORNEYS

Aug. 4, 1964     H. SPRAGG     3,143,304
CRUSHING APPARATUS
Filed Aug. 15, 1960     3 Sheets-Sheet 3
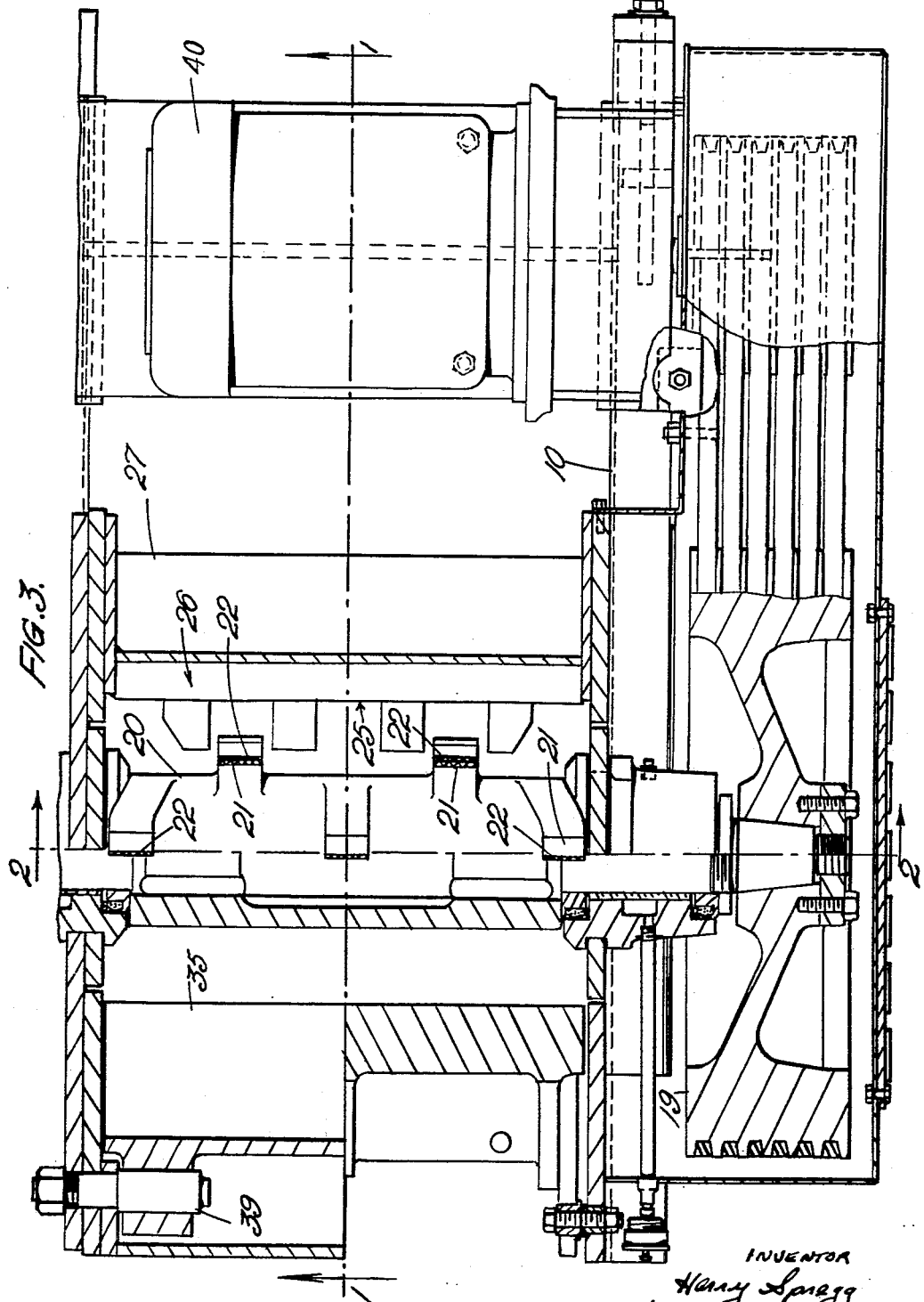

United States Patent Office 3,143,304
Patented Aug. 4, 1964

3,143,304
CRUSHING APPARATUS
Harry Spragg, Chesterfield, England, assignor to Markham & Company Limited, Chesterfield, England, a British company
Filed Aug. 15, 1960, Ser. No. 49,492
3 Claims. (Cl. 241—186)

This application is a continuation-in-part of application S.N. 618,517, filed October 26, 1956, which is now abandoned.

This invention relates to an improved method and apparatus for disintegrating rock by shearing and is based on the realisation that the shearing strength of certain rocks for example, sedimentary rocks, is considerabl less than their compressive strength for example, less than one fifth or sixth.

Certain of the factors which determine whether shearing takes place as distinct from crushing are the relative velocity between the rock and shearing members at the initial time of contact and the extent and direction of the pressure exerted on the rock by the shearing members.

According to this invention a method of disintegrating rock by shearing consists in directing the rock between shearing members moving relatively to one another at a velocity of from 200 to 600 feet per minute in such a direction that there is a small clearance between them when they pass one another and which shearing members apply a shear stress of between .097 and .7 ton per square inch in accordance with the nature of the rock to be disintegrated.

In applying the above method to the shearing of granite the relative velocity between the shearing elements is from 200 feet to 400 feet per minute and the sheer stress is from .36 ton per square inch to .7 ton per square inch.

In applying the method to the shearing of limestone the velocity of shearing is about 300/500 feet per minute and the shearing stress is between .18 and .7 ton per square inch.

In applying the method to sandstone the velocity of shearing may be about 400/600 feet per minute and the shearing stress between .097 and .7 ton per square inch.

An apparatus for shearing rock in accordance with the above method may be of the kind comprising a rotor rotatable about a substantially horizontal axis and at least one shearing member projecting from the periphery thereof which during rotation sweeps past another shearing member or anvil fixed to a fixed part of the apparatus and a guiding surface extending upwardly from the anvil and from the opposite side of the rotor so as to guide the material to be sheared into the path of the moving shearing member.

In order to ensure that only shearing forces are applied to the rock to be disintegrated the surface of the guide plate extending above the anvil must be of a particular shape.

According to this invention an apparatus of the kind referred to and for shearing rock is characterised in that the surface of the guide plate extending above the anvil is concavely curved about axes parallel with the axis of rotation and is of such a shape that it extends upwardly and outwardly from points of intersection of tangents drawn from points on the circular path of travel of the tip of the shearing member which surface ensures that the rock is pushed by the revolving shearing member upwardly out of engagement with the other shearing member should forces other than shearing forces be applied to the rock.

The aforesaid curved surface may be an involute curve developed from the swept rotor circle and extending upwardly from the anvil. After development this curved surface is tilted from the rotor by an angle of 10 to 15° i.e. rotated about a centre point located at the anvil edge. It is found with this arrangement that the rock is rapidly fed in between the shearing members and that compression of the rock against the curved surface of the guide plate is not possible.

Figure 2:
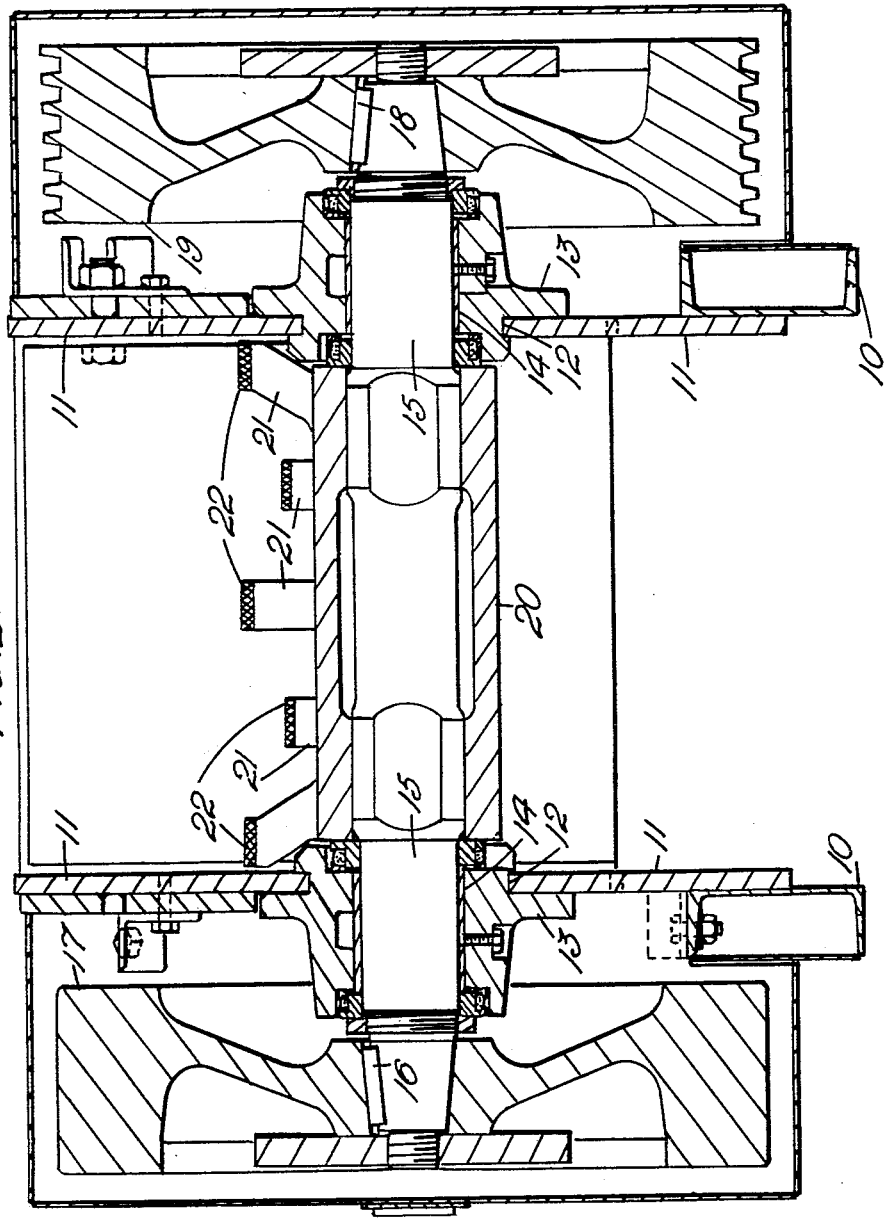

The following is a more detailed description of one form of apparatus for shearing rock reference being made to the accompanying drawings in which:

FIGURE 1 is a cross-section through the apparatus on the line 1—1 of FIGURE 3 and on a plane at right angles to the axis of rotation;

FIGURE 2 is a vertical section through the apparatus on the line 2—2 of FIGURES 1 and 3 in a vertical plane containing the axis of rotation; and FIGURE 3 as to its upper half is a section on the line 3—3 of FIGURE 1 and as to its lower half is a section on line 3—3'.

The apparatus comprises two spaced channel section frame members 10 to each of which is secured a vertical plate 11 which plates have openings 12 in which are secured bearing housings 13. The bearings 14 within the housings support journal portions of a rotor shaft 15 are end of which rotor shaft has keyed to it at 16 a fly-wheel 17 and the other end has keyed to it at 18 a multi-grooved belt pulley 19. The shaft also has secured to it an encircling sleeve 20 from which projects a number of arms 21 formed integrally therewith and as viewed along the axis of the shaft are in staggered relationship. The extremities of the arms are provided with shearing cutters 22. Bolted at 23 between the plates 11 on one side of the rotor is a casting 24 having a vertical face 25 extending upwardly from a point below the rotor to a point slightly above the axis of rotation and then continues as a concavely curved cylindrical surface 26 struck about an axis above the axis of rotation. These two walls are strengthened by web portions 27 and at their ends join vertical portions 28 extending transversely to the axis of rotation. On the other side of the rotor there extends between the two plates 11 at their upper ends thereof an angle section member 29 having a web portion 30 which is bolted at 31 to said plates and lower down there extends between the two plates a rigid bridge-piece 32 having an upper face which is inclined upwardly as it extends towards the rotor and also has a web portion 41 secured to the underside thereof. The bridge-piece at its end has flanges 33 which are clamped by screws 34 to the plates 11. By reason of the fact that the side plates 11 are secured together by the angle section member 29 and the bridge piece 32, this results in a strong and rigid structure for taking the reaction forces consequent upon the shearing of the rock.

Pivoted to the web portion 30 of the angle section bar 29 by means of a pivot pin 39 is the upper end of a casting which has a curved face 35 extending upwardly from a horizontal plane containing the axis of rotation of the rotor. A flat vertical face 36 extends downwardly from the lower extremity of the curved face. At the junction between the curved and vertical faces is secured a shearing bar 37 formed from tough steel or preferably the anvil edge is protected by hard metal welded on. As previously indicated face 35 has an involute which is tilted back from the rotor at an angle of 10 to 15° from a centre point located at the anvil edge, the metal employed for the curved face may be formed from cast steel.

The casting is retained in the required position by means of a shear pin 38 extending between a web portion 42 at the back of the casting and the plates 11.

The rock after being sheared drops below the rotor between the side plates 11 into an appropriate chute.

The multi-grooved belt pulley 19 is driven by a belt from a pulley which in its turn is driven through gearing from a motor 40.

I claim:

1. An apparatus for shearing of rock comprising a rotor rotable about a substantially horizontal axis at least one shearing member projecting from the periphery thereof and which during rotation sweeps past another shearing member or anvil fixed to a fixed part of the apparatus and a guide surface extending upwardly from the latter shearing member so as to guide the material to be sheared into the path of movement of the movable shearing member characterised in that the guide plate extending above the anvil is concavely curved about axes parallel to the axis of rotation to provide an involute curve extending upwardly from the anvil and tilted away from the rotor at an angle of between 10° and 15° from a center point located adjacent the anvil edge.

2. An apparatus according to claim 1 wherein the anvil is arranged at a level such that its shearing edge lies in substantially a horizontal plane containing the axis of rotation of the rotor.

3. An apparatus according to claim 2 wherein the anvil is in the form of a straight bar extending along the axial length of the rotor and the rotor is provided with a number of projecting shearing members which are arranged in circumferential staggered relationship so as sweep successively past the anvil.

References Cited in the file of this patent

UNITED STATES PATENTS

| Re. 11,634 | Williams | Oct. 26, 1897 |
| 629,262 | Lombard | July 18, 1899 |
| 1,721,183 | McKain | July 16, 1929 |
| 2,801,626 | Potter et al. | Aug. 6, 1957 |
| 2,803,410 | Bodoni | Aug. 20, 1957 |

FOREIGN PATENTS

| 344,890 | Great Britain | Mar. 12, 1931 |
| 27,275 | Holland | July 15, 1932 |
| 957,718 | Germany | Feb. 7, 1957 |